United States Patent
Challa et al.

(10) Patent No.: US 8,437,433 B2
(45) Date of Patent: May 7, 2013

(54) ZEROING-OUT LLRS USING DEMOD-BITMAP TO IMPROVE PERFORMANCE OF MODEM DECODER

(75) Inventors: Raghu N. Challa, San Diego, CA (US); Jeremy H. Lin, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 778 days.

(21) Appl. No.: 12/404,636

(22) Filed: Mar. 16, 2009

(65) Prior Publication Data

US 2009/0245431 A1    Oct. 1, 2009

Related U.S. Application Data

(60) Provisional application No. 61/040,574, filed on Mar. 28, 2008.

(51) Int. Cl.
*H03D 3/24* (2006.01)

(52) U.S. Cl.
USPC .......................................... 375/340; 375/324

(58) Field of Classification Search .............. 375/340
See application file for complete search history.

(56) References Cited

U.S. PATENT DOCUMENTS

| | | | | |
|---|---|---|---|---|
| 5,214,391 | A * | 5/1993 | Serizawa et al. | 329/316 |
| 6,628,675 | B1 * | 9/2003 | Neufeld | 370/503 |
| 6,771,720 | B1 * | 8/2004 | Yang et al. | 375/345 |
| 7,778,249 | B2 * | 8/2010 | Dougall et al. | 370/392 |
| 7,885,631 | B2 * | 2/2011 | Yang et al. | 455/312 |
| 7,986,958 | B2 * | 7/2011 | Heo et al. | 455/522 |
| 2004/0267857 | A1 | 12/2004 | Abel et al. | |
| 2006/0045214 | A1 | 3/2006 | Shiina | |
| 2006/0078075 | A1 * | 4/2006 | Stamoulis et al. | 375/346 |
| 2007/0060061 | A1 | 3/2007 | Sampath | |
| 2007/0064788 | A1 * | 3/2007 | Yonge, III | 375/239 |

(Continued)

FOREIGN PATENT DOCUMENTS

| | | |
|---|---|---|
| JP | 2003037577 A | 2/2003 |
| JP | 2003087125 A | 3/2003 |

(Continued)

OTHER PUBLICATIONS

International Search Report and Written Opinion—PCT/US2009/038211, International Search Authority—European Patent Office—Mar. 25, 2009.

(Continued)

*Primary Examiner* — David Ometz
*Assistant Examiner* — Santiago Garcia
(74) *Attorney, Agent, or Firm* — Abdollah Kotbab (57) ABSTRACT

A demodulation mask bitmap includes binary mask values. Each mask value corresponds to an input resource element to a demodulator. For each mask value of a first state, a demodulation engine of the demodulator is not clocked and the demodulator outputs a zero-valued resource element. For each mask value of a second state, the demodulation engine is clocked, the input resource element is demodulated, and the demodulator outputs a demodulated resource element. A demodulation mask bitmap is designed to mask pilot resource elements and corrupted resource elements. Power is conserved by not clocking the demodulation engine for corrupted and pilot resource elements. Subsequent LLR generation and decode operations are simplified. Decoder performance is improved because the decoder does not decode LLR values derived from corrupted resource elements and/or resource elements not relevant to the reconstruction of a communicated message.

26 Claims, 9 Drawing Sheets

DEMOD-BITMAP DATA PROCESSING

U.S. PATENT DOCUMENTS

| | | | |
|---|---|---|---|
| 2007/0121571 A1* | 5/2007 | Doberstein et al. | 370/350 |
| 2007/0195738 A1 | 8/2007 | Kim | |
| 2007/0270100 A1* | 11/2007 | Agrawal et al. | 455/67.11 |
| 2008/0102879 A1* | 5/2008 | Heo et al. | 455/522 |
| 2008/0162997 A1* | 7/2008 | Vu et al. | 714/27 |
| 2008/0165804 A1* | 7/2008 | Thyagarajan | 370/474 |
| 2008/0182543 A1* | 7/2008 | Yang et al. | 455/296 |
| 2009/0060093 A1* | 3/2009 | Narahari et al. | 375/340 |
| 2010/0085925 A1* | 4/2010 | Kishiyama et al. | 370/329 |
| 2010/0208612 A1* | 8/2010 | Schultz et al. | 370/252 |

FOREIGN PATENT DOCUMENTS

| | | |
|---|---|---|
| JP | 2003264468 A | 9/2003 |
| RU | 2263947 | 11/2005 |
| WO | 2006102909 A1 | 10/2006 |
| WO | WO2007087540 A2 | 8/2007 |
| WO | 2007138753 A1 | 12/2007 |

OTHER PUBLICATIONS

Taiwan Search Report—TW098110210—TIPO—Oct. 8, 2012.

* cited by examiner

DEMOD-BITMAP DATA PROCESSING

FIG. 5

DEMOD-BITMAP DATA PROCESSING

DEMOD-BITMAP DATA PROCESSING

FIG. 8

PROCESSOR TASK LIST PREPARATION AND MAINTENANCE

FIG. 9

TASK MANAGER OPERATION

FIG. 10

| OP | LN | UNUSED | T/R | TASK INDEX | UNUSED | I/M | A/T | RTC COUNT | |
|---|---|---|---|---|---|---|---|---|---|
| 4 | 8 | 11 | 1 | 8 | 7 | 1 | 2 | 22 | |

63　　　　　　　　　　　　　　　　　　　　　　　　　　　　　　　　　　　　　　　0

DEMOD_MASK_BITMAP[127:64]

DEMOD_MASK_BITMAP[63:0]

| UNUSED | PHASE ROT 2 IMAG | PHASE ROT 2 REAL | PHASE ROT 1 IMAG | PHASE ROT 1 REAL | PHASE ROT 0 IMAG | PHASE ROT 0 REAL |
|---|---|---|---|---|---|---|
| 10 | 9 | 9 | 9 | 9 | 9 | 9 |

| UNUSED | PHASE ROT 5 IMAG | PHASE ROT 5 REAL | PHASE ROT 4 IMAG | PHASE ROT 4 REAL | PHASE ROT 3 IMAG | PHASE ROT 3 REAL |
|---|---|---|---|---|---|---|
| 10 | 9 | 9 | 9 | 9 | 9 | 9 |

| UNUSED | PHASE ROT 7 IMAG | PHASE ROT 7 REAL | PHASE ROT 6 IMAG | PHASE ROT 6 REAL |
|---|---|---|---|---|
| 28 | 9 | 9 | 9 | 9 |

| LAYER2_OFFSET | OFDM OFFSET (SRC ADDRESS OFFSET) | SUBTILE START PATTERN | UNUSED | NUM SUB TILES | TILE LENGTH | TILE WIDTH |
|---|---|---|---|---|---|---|
| 22 | 16 | 16 | 3 | 3 | 5 | 5 |

DEMOD CONFIG TASK INSTRUCTION

FIG. 11

ZEROING-OUT LLRS USING
DEMOD-BITMAP TO IMPROVE
PERFORMANCE OF MODEM DECODER

CROSS-REFERENCE TO RELATED
APPLICATION

This application claims the benefit under 35 U.S.C. §119 of Provisional Application Ser. No. 61/040,574, filed Mar. 28, 2008, and said provisional application is incorporated herein by reference.

BACKGROUND INFORMATION

1. Technical Field

The present disclosure relates to the operation of a demodulator as part of a number of sub-circuits that operate together to process a data stream, and more particularly the present disclosure relates to the use of a demodulation bitmap of mask values to control the operation of a demodulator.

2. Background Information

Wireless communication systems are widely used to communicate various types of data including voice and video. Commonly, these systems are multiple-access systems capable of supporting communication with multiple users by sharing available system resources such as bandwidth and transmission power. Examples of multiple access systems include Code Division Multiple Access (CDMA) systems, Time Division Multiple Access (TDMA) systems, Frequency Division Multiple Access (FDMA) systems, Long Term Evolution (LTE), and Orthogonal Frequency Division Multiple Access (OFDMA) systems.

The transmission of a data stream using any of the aforementioned communication systems typically involves coding, multiplexing, and modulating the data stream. In addition, pilot data are typically multiplexed with the coded data. Pilot data of known patterns are processed in a known manner and may be used by the receiver system to estimate channel response. Modulation is typically performed based on a particular modulation scheme such as BPSK, QPSK, 16 QAM, or 64 QAM to map the data stream into a sequence of modulation symbols, for example Orthogonal Frequency Division Multiplex (OFDM) symbols, which may be further processed before transmission.

Receiving a data stream typically involves demodulating a received {I,Q} data symbol stream, followed by a process of demapping and decoding to recover the original data stream. The demapping process typically includes a Log-Likelihood Ratio (LLR) generator responsible for generating LLR values useable by the decoder. In a typical system, an LLR value is generated for each {I,Q,SNR} demodulated symbol value or "triplet." However, some symbols are pilot symbols, useful for channel detection, but not for the recovery of the original data stream. LLR values generated from these pilot symbols may be significant in magnitude relative to non-pilot data symbols and may degrade decoder performance. Furthermore, the process of demodulating, generating LLR values, and decoding pilot symbols wastes power and processing throughput. In addition, some data symbols are known to be corrupted before the demodulation step. Similarly, it is desirable to avoid wasting power processing corrupted data symbols and propagating errors further down the signal processing chain.

SUMMARY

A digital system includes a novel demodulator sub-circuit. In one example, the demodulator sub-circuit includes a task manager and an amount of configurable but specialized hardware circuitry for selectively demodulating a resource element (e.g., an {I,Q} symbol value) and outputting a demodulated resource element (e.g., an {I,Q,SNR} demodulated symbol value triplet) depending on the value of a binary mask value of a demodulation mask bitmap. The task manager of the demodulator sub-circuit can configure and control the configurable hardware. The digital system further includes a processor that is tightly coupled to a memory by a first bus. In operation, the processor of the system configures the operation of the demodulator sub-circuit and orchestrates its operation and timing by maintaining a task list in the memory. The task list includes task instructions for the demodulator sub-circuit, including a DEMOD Config task instruction that includes a demodulation mask bitmap. The task manager reads the task instructions out of its task list in the memory across a second bus. After the task manager has read a task instruction across the second bus, the task manager interprets the task instruction and causes the demodulator sub-circuit to perform an operation as indicated by the task instruction.

In one example, the demodulation mask bitmap includes a two-dimensional array of binary mask values. Each mask value corresponds to a resource element received into the demodulator sub-circuit. If the mask value corresponding to a resource element to be processed by the demodulator sub-circuit is a first state, then a demodulator within a demodulation engine is not clocked. Furthermore, the demodulation engine outputs a zero-valued resource element corresponding to that input resource element. If, on the other hand, the mask value corresponding to the resource element to be processed is a second state, then the demodulator is clocked. The demodulation engine demodulates the input resource element and outputs a demodulated resource element corresponding to the input resource element. In some examples, the mask values corresponding to pilot resource elements are set to the first state. In other examples, the mask values corresponding to corrupted resource elements are set to the first state. Resource elements associated with pilot data and corrupted data are not demodulated, thus saving power that would otherwise be consumed to perform the demodulation. Furthermore, by zeroing demodulated symbol values corresponding to pilot values and corrupted data values, decoder performance is improved. The demodulation mask bitmap described sees general applicability in the demodulation of data streams where it is known before demodulation that specific resource elements are corrupted and/or are not relevant to subsequent data processing steps.

The foregoing is a summary and thus contains, by necessity, simplifications, generalizations and omissions of detail; consequently, those skilled in the art will appreciate that the summary is illustrative only and does not purport to be limiting in any way. Other aspects, inventive features, and advantages of the devices and/or processes described herein, as defined solely by the claims, will become apparent in the non-limiting detailed description set forth herein.

DETAILED DESCRIPTION

Figure 1:
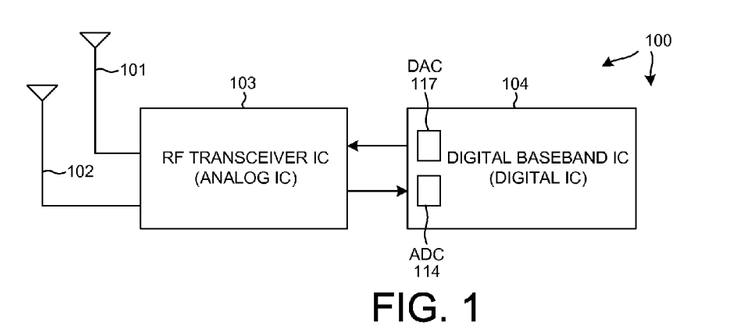
FIG. 1 is a simplified diagram of a mobile communication device in accordance with one novel aspect.

FIG. 1 is a very simplified high level block diagram of one particular type of mobile communication device 100 in accordance with one aspect. In this particular example, mobile communication device 100 is a cellular telephone. Mobile communication device 100 includes (among several other parts not illustrated) two antennas 101 and 102 and two integrated circuits 103 and 104. Integrated circuit 103 is an RF transceiver integrated circuit. RF transceiver integrated circuit 103 is called a "transceiver" because it includes a transmitter as well as a receiver. RF transceiver integrated circuit 103 is principally an analog integrated circuit involving analog circuitry. Integrated circuit 104, on the other hand, is principally a digital integrated circuit that includes digital circuitry. Integrated circuit 104 is often called a "digital baseband integrated circuit" or a "baseband processor integrated circuit." There are other ways of partitioning the electronics of a mobile communication device, but this is one exemplary way.

Figure 2:
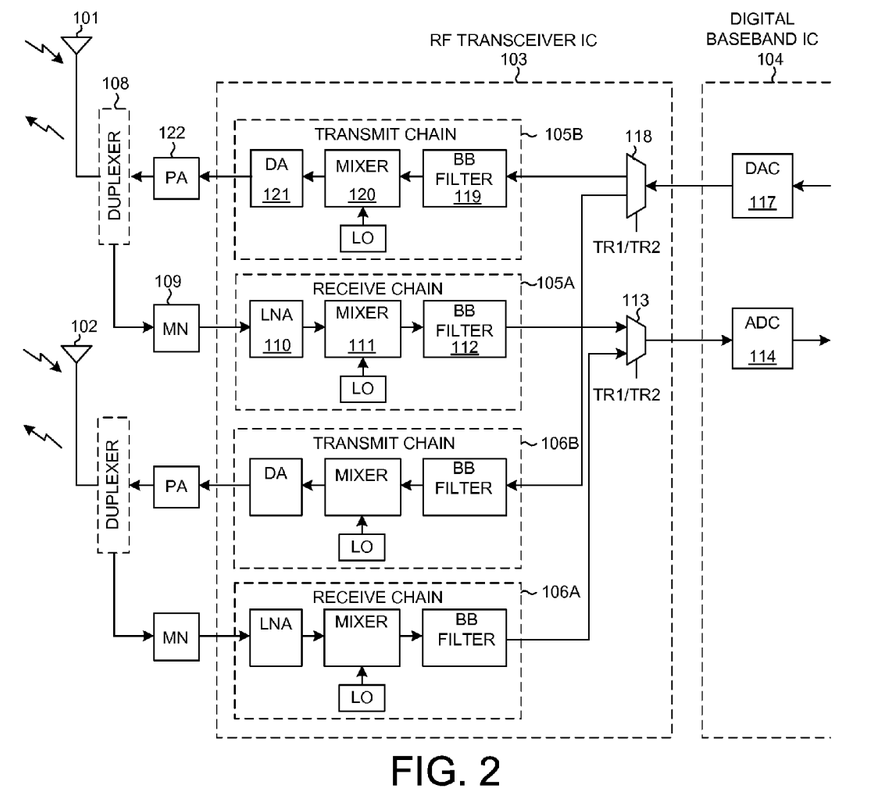
FIG. 2 is a more detailed diagram of the RF transceiver integrated circuit of the mobile communication device of FIG. 1.

FIG. 2 is a more detailed block diagram of RF transceiver integrated circuit 103. This particular transceiver includes two transceivers. The first transceiver includes receive chain 105A and transmit chain 105B. The second transceiver includes receive chain 106A and transmit chain 106B. A high frequency RF signal is received onto one or both of the antennas when cellular telephone 100 is receiving. For an RF signal received onto antenna 101, the signal passes through duplexer 108, matching network 109, and through the receive chain 105A. The signal is amplified by Low Noise Amplifier (LNA) 110 and is down-converted in frequency by mixer 111. The resulting down-converted signal is filtered by baseband filter 112 and is passed to the digital baseband integrated circuit 104 via an appropriately controlled multiplexer 113. An Analog-to-Digital Converter (ADC) 114 in digital baseband integrated circuit 104 converts the signal into a stream of digital samples. The stream of samples is then processed by a receive channel 115 (see FIG. 3) within digital baseband integrated circuit 104.

If cellular telephone 100 is to be transmitting from antenna 101, then information to be communicated is processed by transmit channel 116 (see FIG. 3) of the digital baseband integrated circuit 104 and is converted into analog form by a Digital-to-Analog Converter (DAC) 117. The resulting analog signal is supplied via an appropriately controlled demultiplexer 118 to "transmit chain" 105B of RF transceiver integrated circuit 103. Baseband filter 119 filters out noise introduced by the digital-to-analog conversion process. Mixer block 120 then up-converts the signal into a high frequency signal. Driver amplifier 121 and an external power amplifier 122 amplify the high frequency signal to drive antenna 101 so that a high frequency RF signal is transmitted from antenna 101. In mobile communication device 100, one or both of the antennas can be used depending on the mode of operation.

Figure 3:
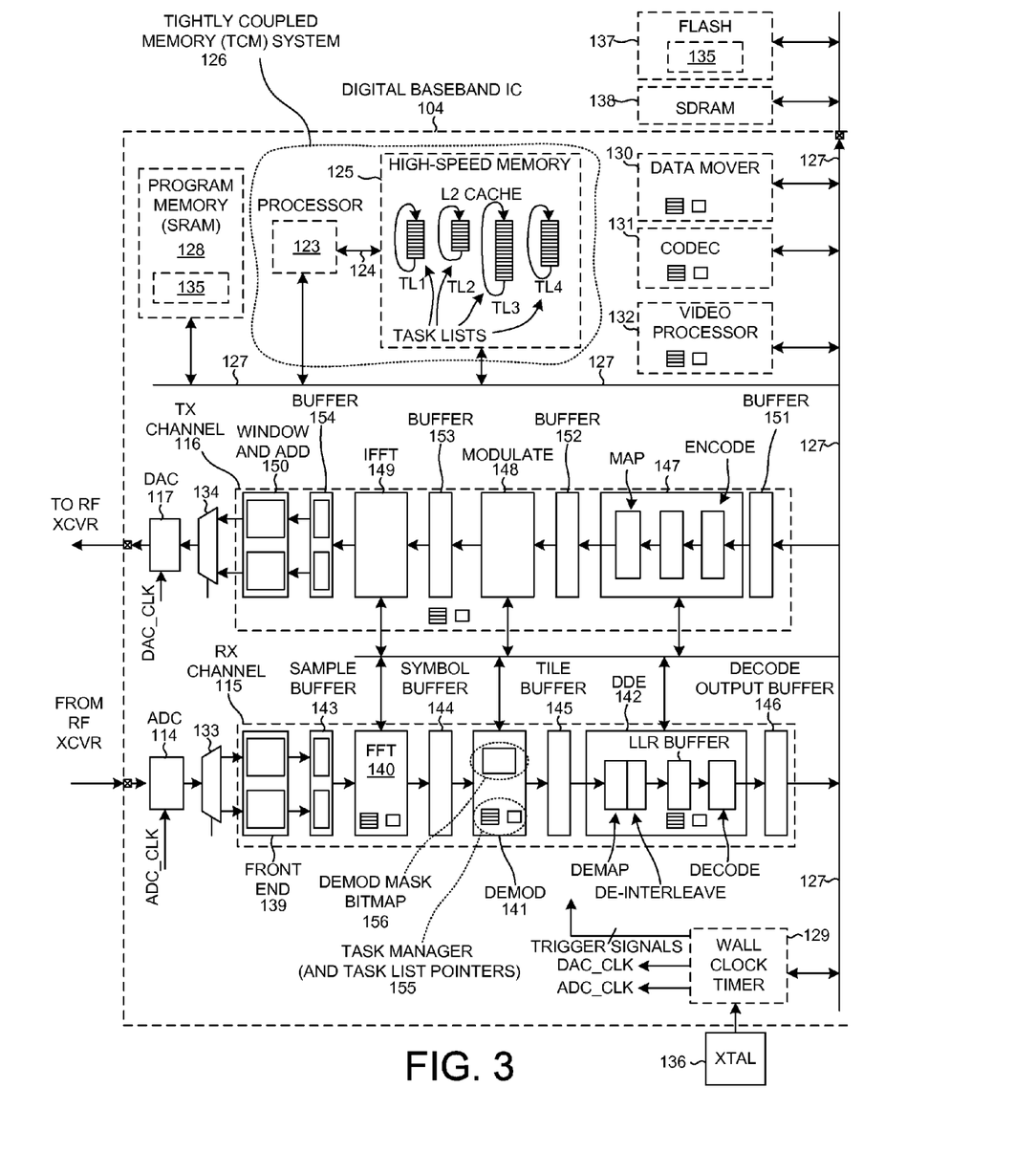
FIG. 3 is a more detailed diagram of the digital baseband integrated circuit of the mobile communication device of FIG. 1.

FIG. 3 is a more detailed block diagram of the digital baseband integrated circuit 104 of FIG. 1. In addition to ADC 114, receive channel 115, transmit channel 116 and DAC 117, digital baseband integrated circuit 104 includes a processor 123, a first bus 124, and an amount of high-speed multi-banked dual port memory 125. Processor 123 can read from and write to memory 125 via first bus 124. Processor 123 is a multi-core processor or a multi-threaded processor and may actually involve multiple processors. First bus 124 is a high-speed, point-to-point, bus involving one master, the processor 123, and one slave, memory 125. Processor 123, first bus 124, and memory 125 together form what is referred to as a Tightly Coupled Memory (TCM) system 126. Memory 125 is not program memory, but rather is high speed, level-two cache, multi-ported and multi-banked, memory used for storage of variables and data and control information.

In addition, digital baseband integrated circuit 104 includes a second bus 127, an amount of program memory 128, a wall clock timer 129, a data mover block 130, a codec block 131, a video processor block 132, a set of two-to-one demultiplexers 133, and a set of one-to-two multiplexers 134. Program memory 128 stores a program of instructions 135 that is executed by processor 123. Wall clock timer 129 uses a reference clock signal supplied by an external crystal 136 to increment a counter. The counter outputs a continuously incrementing sequence of count values that is an indication of real time. The processor 123 and other circuits on second bus 127 can read from and write to the wall clock timer 129 across second bus 127. Memory 125 is accessible by processor 123 across first bus 124 with a smaller memory access latency than memory 125 is accessible via second bus 127. The digital baseband integrated circuit 104 of FIG. 3 is also coupled via second bus 127 to an external FLASH non-volatile memory device 137 and to an external Synchronous Dynamic Random Access Memory (SDRAM) 138. The data mover block 130 and the processor 123 can read from and write to external devices 137 and 138 across second bus 127.

Receive channel 115 (baseband receive hardware) includes a plurality of functional blocks 139-142, referred to here as Wireless Communication System Modem Sub-Circuits (WCSMSCs). WCSMSCs 139-142 include a front end sub-circuit 139, a Fast Fourier Transform (FFT) sub-circuit 140, a demodulate (DEMOD) sub-circuit 141, and a Demap/De-Interleave/Decode (DDE) sub-circuit 142. An amount of memory, referred to here as a "sample buffer" 143, buffers data passing from front end WCSMSC 139 to FFT WCSMSC 140. A similar amount of memory, referred to here as a "symbol buffer" 144, buffers data passing from FFT WCSMSC 140 to DEMOD WCSMSC 142. Another amount of memory, referred to here as a "tile buffer" 145, buffers data passing from DEMOD WCSMSC 141 to DDE WCSMSC 142. A "decode output buffer" 146 buffers data passing from DDE WCSMSC 142 to second bus 127. The general path of receive channel data is from left to right in FIG. 3 through circuits 114, 133, 139, 143, 140, 144, 141, 145, 142, and 146, to second bus 127.

Transmit channel 116 includes another plurality of Wireless Communication System Modem Sub-Circuits (WCSMSCs) 147-150. WCSMSCs 147-150 include an encode/interleave/map sub-circuit 147, a modulate sub-circuit 148, an Inverse Fast Fourier Transform (IFFT) sub-circuit 149, and a window and add sub-circuit 150. The various sub-circuits of the transmit channel are buffered by a set of buffers 151-154 as illustrated. The general path of transmit channel data is from right to left through circuits 151, 147, 152, 148, 153, 149, 154, 150, 134, and 117, to RF transceiver integrated circuit 103.

Memory 125 of Tightly Coupled Memory system 126 stores a plurality of task lists as illustrated. Each task list contains a sequence of task instructions for execution by an associated sub-circuit of the digital baseband integrated circuit 104. In the illustrated example, task list TL1 contains task instructions for FFT WCSMSC 140. Task list TL2 contains task instructions for DEMOD WCSMSC 141. Task list TL3 contains task instructions for DDE WCSMSC 142. Task list TL4 contains task instructions for data mover block 130. Although not illustrated in FIG. 3, memory 125 also contains a task list for the transmit channel circuitry 116 as a whole, for codec block 131, and for video processor block 132. Processor 123 can write task instructions into these task lists, modify these task list, delete task lists, and otherwise maintain the task lists as desired via first bus 124. Each task list is maintained in memory 125 in a circular buffer. Each task list contains task instructions that, when executed by the appropriate sub-circuit, configure and control the sub-circuit. Each of the associated sub-circuits includes a task manager circuit that is coupled to second bus 127 as well as an amount of dedicated functional circuitry for performing a data processing operation. Reference numeral 155 in FIG. 3 identifies the task manager circuit 155 of DEMOD WCSMSC 141. In one novel aspect, DEMOD WCSMSC 141 includes a demodulation mask bitmap 156 of mask values to control the operation of DEMOD WCSMSC 141 as explained in further detail below.

Figure 4:
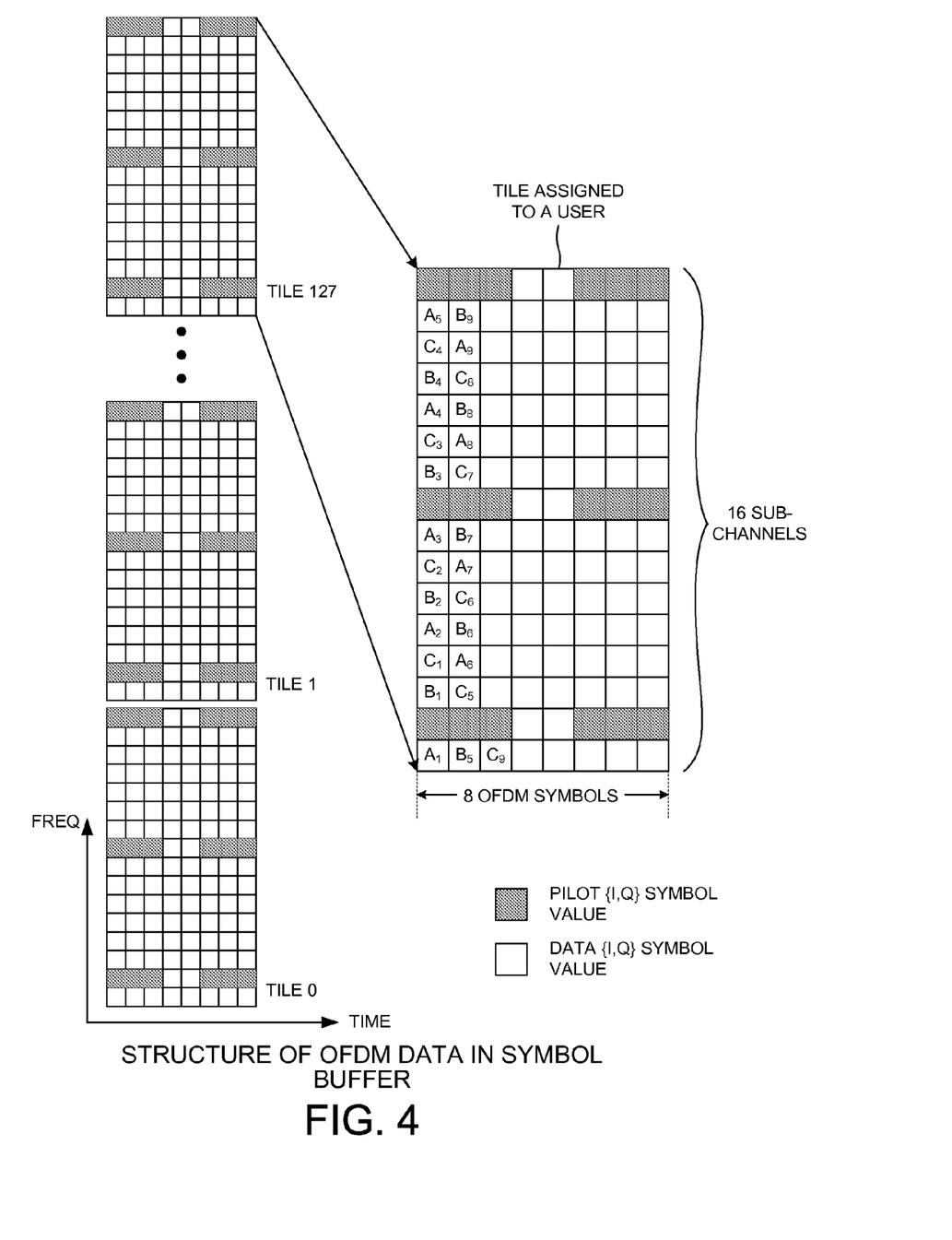
FIG. 4 is a diagram of a structure of OFDM data processed by the digital baseband integrated circuit of FIG. 3.

FIG. 4 illustrates one example of the structure of data stored in symbol buffer 144 and tile buffer 145 in accordance with an Orthogonal Frequency Division Multiplexing (OFDM) scheme. OFDM signals and data may be organized into sub-blocks often referred to as "tiles". A tile is a two-dimensional frequency-time matrix of modulation symbols organized along both a time axis and a frequency axis. FIG. 4 illustrates an example of an OFDM signal separated into 128 tiles according to frequency. Each tile is composed of sixteen separate sub-channels over a period of time spanned by eight OFDM symbols. Thus, each tile may contain up to 128 symbols. Each tile contains both data modulation symbols and pilot modulation symbols. Data modulation symbols are used to carry information relevant to the content of a message being communicated over the wireless communications system. For example, tile 127 is assigned to hold three sub-packets of information {A, B, C}. Sub-packet {A} contains symbols {$A_1, \ldots A_9$}. Sub-packet {B} contains symbols {$B_1, \ldots B_9$}. Sub-packet {C} contains symbols {$C_1, \ldots C_9$}. The various symbols are interspersed throughout the tile by a process of "painting" that allows for pipelining of the demodulation and decoding operations for different sub-packets. Pilot modulation symbols are also illustrated in FIG. 4. Pilot modulation symbols may be used for a variety of tasks, including channel and interference estimation for each layer.

Figure 5:
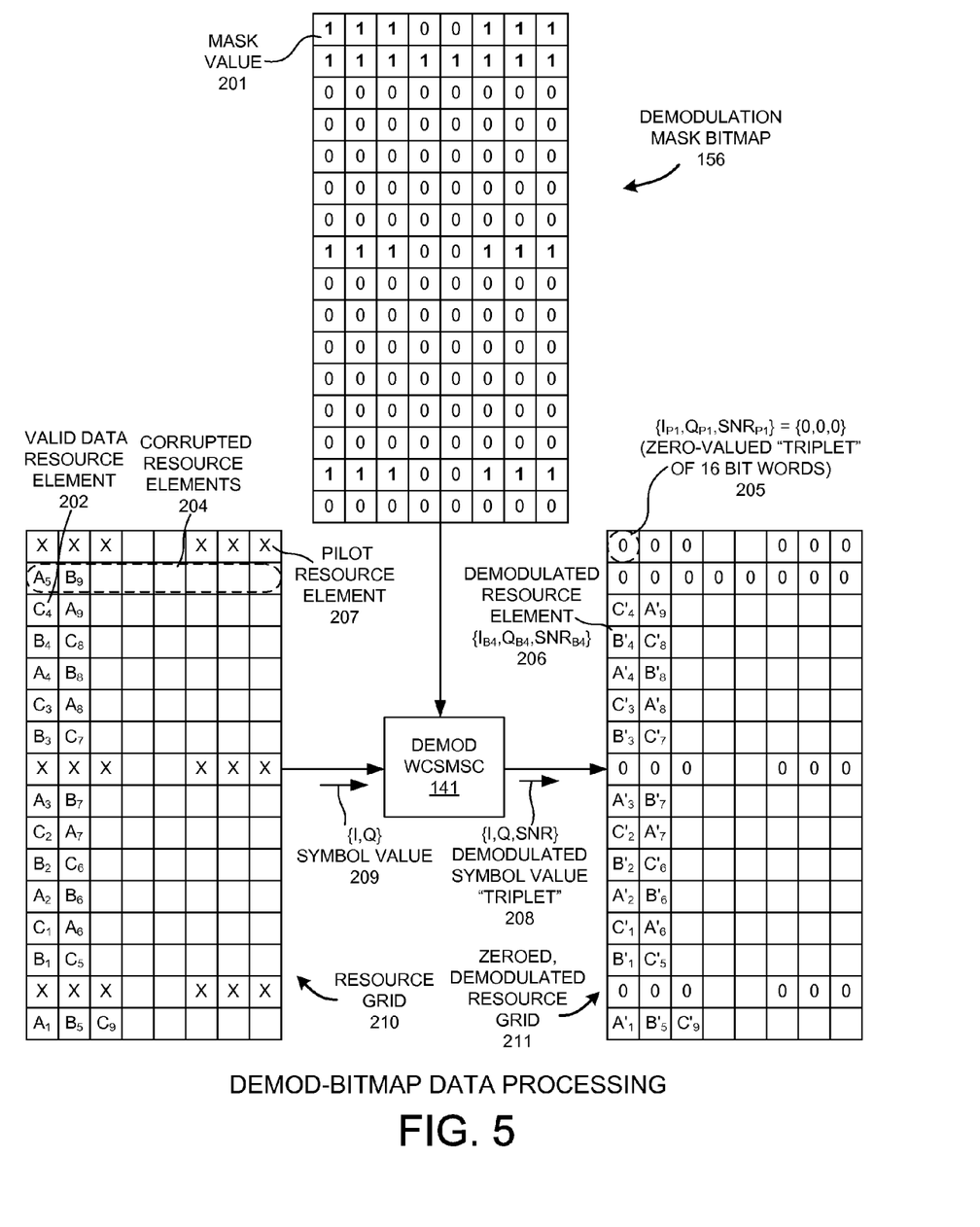
FIG. 5 is a diagram that illustrates the processing of OFDM data by a demodulator controlled by a demodulation mask bitmap of mask values.

FIG. 5 illustrates the processing by DEMOD WCSMSC 141 of modulation symbol data stored in symbol buffer 144 in accordance with one novel aspect. As illustrated in FIG. 3, signal data is processed by FFT WCSMSC 140 to generate a series of resource elements organized in a resource grid 210. In the context of OFDM, each of these resource elements is a complex {I, Q} modulation symbol value 209, wherein I represents the real coefficient of the complex number and Q represents the complex coefficient of the complex number. In this example, these values are organized according to the OFDM structure described in FIG. 4. Resource grid 210 may contain pilot resource elements 207, corrupted resource elements 204, and valid data resource elements 202. Pilot resource elements are known to be associated with pilot symbols useful for channel and interference estimation. However, pilot resource elements do not have to be demodulated to reconstruct the message to be communicated. In fact, LLR values generated from these pilot symbols by DDE WCSMSC 142 may be significant in magnitude relative to non-pilot data symbols and degrade decoder performance. Corrupted resource elements are data resource elements known to be corrupted. For example, a spurious DC signal may corrupt an entire row of data as illustrated in FIG. 5 and this may be known to the processor of the receiver. In another example, narrow-band shifts in frequency may also corrupt data. Many other possible sources of data corruption may exist. It is advantageous not to demodulate corrupted data both to save power and to avoid propagating corrupted results further downstream through the decoder.

The demodulation mask bitmap 156 of mask values is employed to control the operation of DEMOD WCSMSC 141 to selectively demodulate {I, Q} symbol values associated with valid data resource elements to generate an {I,Q,SNR} demodulated symbol value "triplet" 208, and not demodulate others. For each resource element of resource grid 210 there is a corresponding one-bit mask value stored in the demodulation mask bitmap 156. If the mask value 201 corresponding to a particular resource element is a digital zero value, then DEMOD WCSMSC 141 demodulates that resource element and outputs the resulting demodulated resource element 206. In the OFDM example, demodulated resource element 206 is a "triplet" of digital values representing the I, Q, and SNR values of the demodulated resource element. For example, a triplet is comprised of three sixteen-bit words, each indicative of a value of I, Q, and SNR, respectively. If, on the other hand, the mask value 201 corresponding to a particular resource element is a digital one value, then DEMOD WCSMSC 141 does not demodulate that resource element and outputs a zero-valued "triplet" 205. Thus, the digital values representing the I, Q, and SNR values for that resource element are zero. For example, a zero-valued triplet may be a set of three, 16-bit words; all zeros. The demodulated resource elements 206 and zero-valued triplets 205 form a zeroed, demodulated resource grid 211. The zero-valued triplet is ignored by subsequent signal processors such as the demapper, the de-interleaver, and the decoder. This saves power and prevents corrupted data and/or pilot data from further degrading the received message. In other examples, a different predefined value may be employed rather than a zero-valued triplet.

Figure 6:
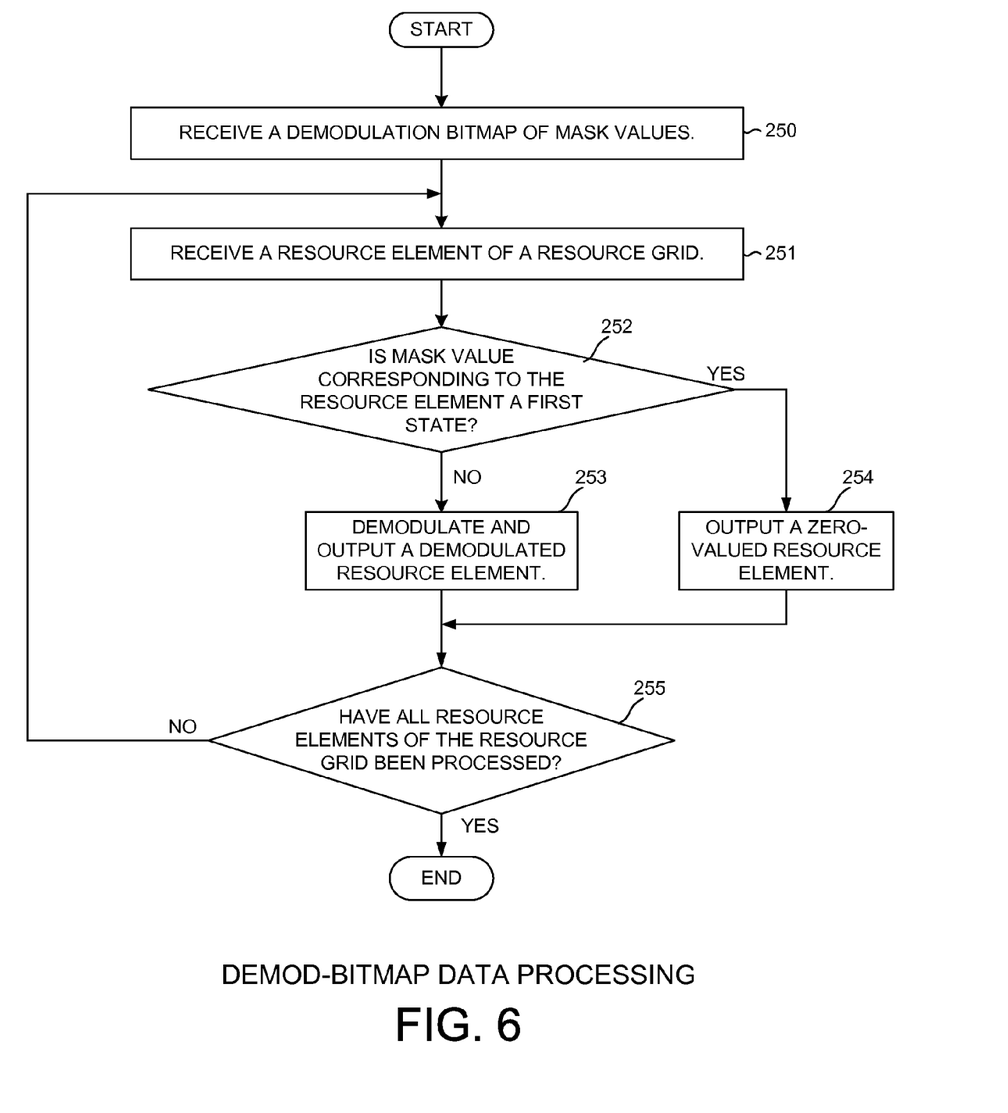
FIG. 6 is a simplified flowchart of the processing of OFDM data by a demodulator controlled by a demodulation mask bitmap of mask values.

FIG. 6 illustrates a flowchart of the data processing performed by DEMOD WCSMSC 141 using the demodulation mask bitmap 156 of mask values. DEMOD WCSMSC 141 receives a demodulation bitmap of mask values (step 250). DEMOD WCSMSC 141 receives a resource element of a resource grid (step 251). DEMOD WCSMSC 141 then evaluates whether the mask value corresponding to the received resource element is a digital one value (step 252). If the mask value is a digital one value, then DEMOD WCSMSC 141 outputs a zero-valued resource element (step 254). If the mask value is not a digital one value, then DEMOD WCSMSC 141 demodulates the received resource element and outputs a demodulated resource element (step 253). DEMOD WCSMSC 141 then determines if all of the resource elements of a particular resource grid have been processed (step 255). If all resource elements have been processed, the task ends, but if there are remaining resource elements, then DEMOD WCSMSC 141 receives the next resource element and proceeds as described above.

Figure 7:
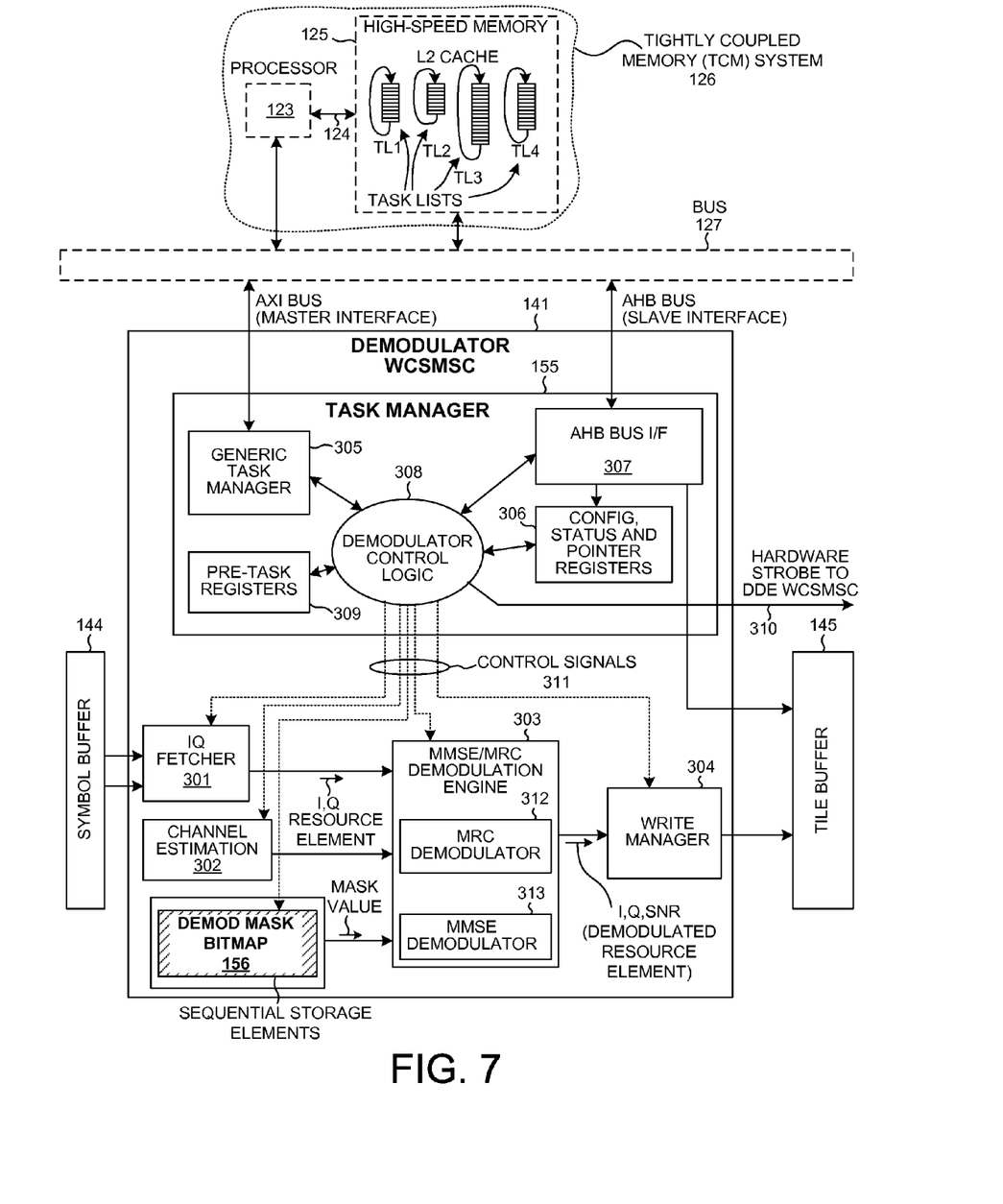
FIG. 7 is a block diagram of the DEMOD WCSMSC 141 of FIG. 3.

FIG. 7 is a block diagram of DEMOD WCSMSC 141 of FIG. 3. DEMOD WCSMSC 141 includes a task manager circuit 155, an IQ fetcher 301, a channel estimation circuit 302, a demodulation mask bitmap 156, a MMSE/MRC demodulation engine 303, and a write manager 304. Task manager circuit 155 includes a generic task manager portion 305, a set of registers 306 including pointer registers, an AHB bus interface 307, a demodulator control state machine portion 308, and a set of pre-task registers 309. Generic task manager portion 305 interfaces to an AXI bus portion of second bus 127 as a master. AHB bus interface 307 interfaces to an AHB bus portion of second bus 127 as a slave. The general flow of data is through a pipelined data path from symbol buffer 144, through the DEMOD WCSMSC 141, and to tile buffer 145. The task manager 155 uses the AXI bus interface to read task instructions from tightly coupled memory 125. Processor 123 acts as a master on the AHB bus and uses the slave AHB interface 307 to read internal registers of the DEMOD WCSMSC, to write the WR_PTR register of the registers 306, and to read tile buffer 145 through DEMOD WCSMSC 141. DEMOD WCSMSC 141 can perform three general types of task instructions: a configuration task instruction which when executed loads configuration parameters for the WCSMSC hardware engines for a future demodulation operation to be performed, including a demodulation mask bitmap of mask values, an MMSE task instruction which when executed receives parameters for an MMSE operation and carries out the demodulation, and an MRC task instruction which when executed receives parameters for an MRC operation and carries out the demodulation.

In operation, processor 123 updates the WR_PTR in registers 306 of DEMOD WCSMSC 141, thereby indicating that there is at least one additional task instruction for the DEMOD WCSMSC 141 to execute. Generic task manager 305 determines whether there is new a task instruction in tightly coupled memory 125 for execution by DEMOD WCSMSC 141. If generic task manager 305 determines that there is another task instruction, then generic task manager 305 informs demod control logic 308 and works together with demod control logic 308 to read the task instruction across the second bus 127 and into a register of pre-task registers portion 309. Generic task manager 305 interprets the header of the task instruction, whereas demod control logic 308 interprets the remainder of the task instruction. Demod control logic 308, depending on the results of the interpretation of the task instruction, provides configuration parameters to other portions of DEMOD WCSMSC 141. Demod control logic 308 then causes those other portions to be triggered to perform various operations at various times such that the overall operation specified by and in the task instruction is carried out. Demod control logic 308 implements a different state machine for each task instruction. Upon entering and exiting states of the state machines, demod control logic 308 asserts the control signals. In the design of DEMOD WCSMSC 141 in one example, the state machines are defined in a hardware description language, and the description synthesized to hardware logic using commercially available synthesis tools.

Under control of task manager 155, IQ fetcher 301 reads from symbol buffer 144 to bring in IQ samples from locations designated by the task instruction. There are two such IQ fetchers, one for each of antennas 101 and 102. An incoming I sample value (real value) and its corresponding incoming Q sample value (imaginary value) together comprise an IQ sample. Under control of task manager 155, demodulation mask bitmap 156 delivers mask values corresponding to each of the IQ samples designated by the task instruction. Channel estimation circuit 302 starts and begins estimating the channel, generating channel interpolation values, and aligns the generated interpolation results with the corresponding IQ samples. Thus, the IQ samples, the corresponding mask values, and the associated interpolation results are supplied simultaneously to MMSE/MRC engine 303.

Figure 8:
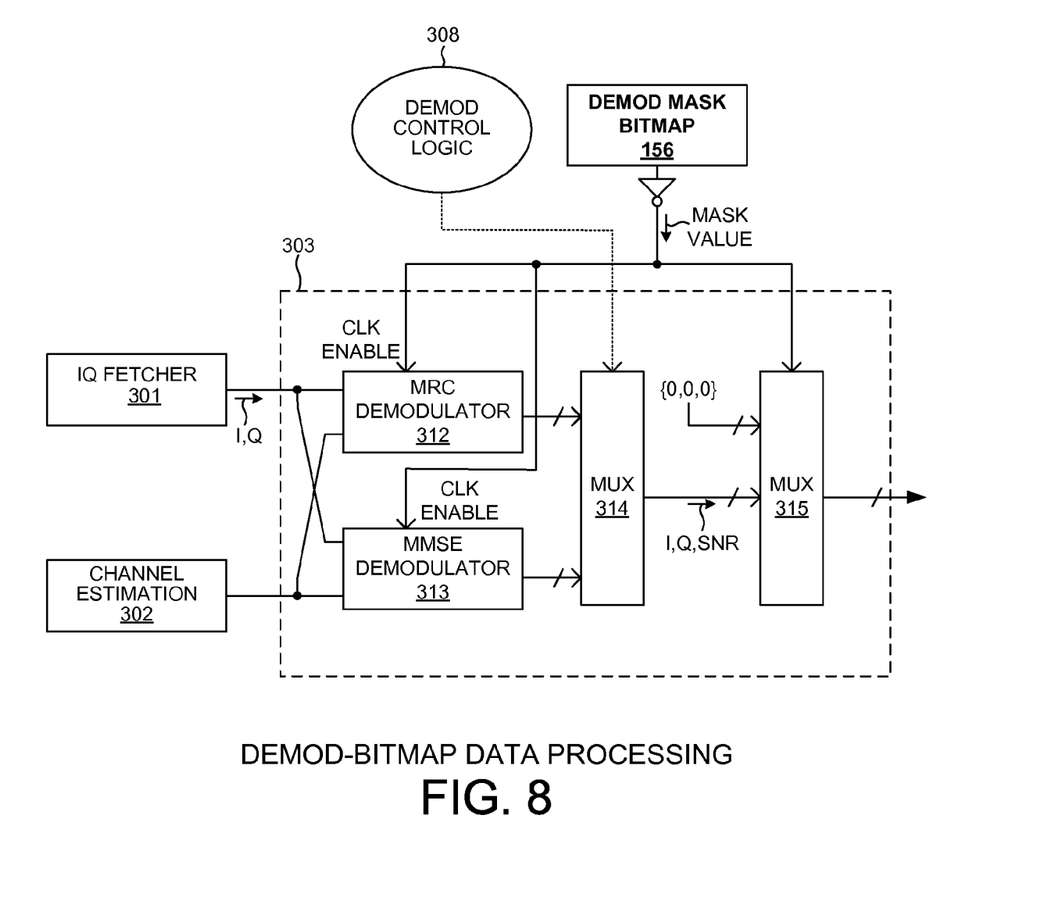
FIG. 8 is a more detailed block diagram of the MMSE/MRC Engine 303 of FIG. 7.

FIG. 8 is a block diagram detailing the operation of MMSE/MRC engine 303. MMSE/MRC engine 303 offers two general types of demodulation operation, a Minimum Mean Square Error (MMSE) type demodulation performed by MMSE demodulator 313 or a Maximum Ratio Combining (MRC) type demodulation performed by MRC demodulator 312. Both demodulation control logic 308 and demodulation mask bitmap 156 control the specific operation of MMSE/MRC engine 303 at every clock cycle. Demodulation mask bitmap 156 delivers a mask value corresponding to each IQ sample brought into MMSE/MRC 303 by IQ fetcher 301. The mask value is delivered to the clock enable input of both MRC demodulator 312 and MMSE demodulator 313 and to multiplexer 315. If the mask value is a digital zero value, both MRC demodulator 312 and MMSE demodulator 313 use the two sets of IQ samples (one for each antenna) and the associated channel estimation values to perform the demodulation task. Each outputs a demodulation output value I, a demodulation output value Q, and an SNR value. Depending on the number of receive channels active and the number of layers, either MMSE type demodulation or MRC type demodulation is used. The demodulation control logic 308 controls multiplexer 314 to select the desired demodulation output in accordance with the task instructions. The digital zero mask value delivered to multiplexer 315 selects the demodulation output of multiplexer 314 to be written to tile buffer 145 by write manager 304 (see FIG. 7). If the mask value is a digital one value, neither MRC demodulator 312 nor MMSE demodulator 313 are clocked and multiplexer 315 selects a zero-valued triplet to be written to tile buffer 145 by write manager 304 (see FIG. 7). In this manner, zero-valued triplets are substituted for data values that are irrelevant or corrupted. Power is saved by not clocking the demodulators 312 and 313 for irrelevant and corrupted data. Furthermore, zeroed elements are not processed further by the downstream signal processing sub-circuits, such as the decoder and the LLR generator. This results in further power savings by processing fewer symbols and also improves decoder performance by eliminating corrupted inputs that degrade the overall output of the decoder.

Referring back to FIG. 7, write manager 304 is instructed by the task manager 155 to write each set of demodulation output value I, demodulation value Q, and SNR value, or alternatively, each zero-valued triplet in tile buffer 145. In this way, demod control logic 308 causes the DEMOD WCSMSC 141 to proceed one symbol at a time. DEMOD WCSMSC 141 reads a symbol from symbol buffer 144, either performs demodulation or not depending on the mask value associated with each symbol, and writes the appropriate result into the tile buffer 145. When the demodulation task specified by the task instruction is finished, demod control logic 308 sets an end-of-task flag in status registers 306. If the task instruction indicates that a hardware strobe signal should be output from DEMOD WCSMSC 141 to initiate an operation in DDE WCSMSC 142, then a strobe signal will be asserted onto conductor 3 10. Conductor 310 extends from DEMOD WCSMSC 141 to DDE WCSMSC 142.

Figure 9:
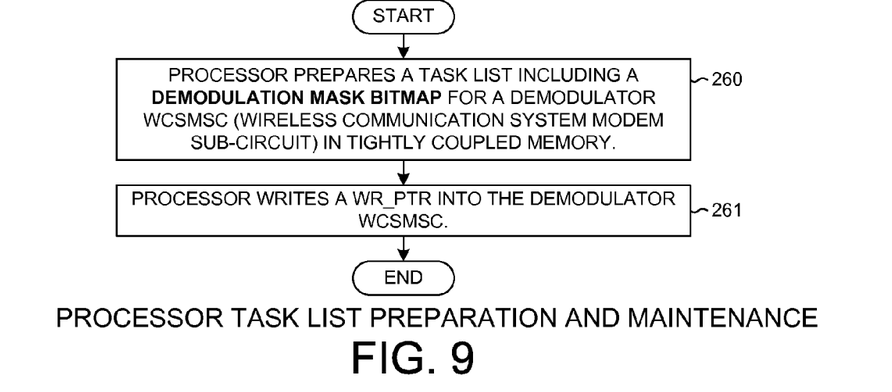
FIG. 9 is a simplified flowchart of illustrating steps taken by a processor to prepare and maintain a task list.

FIG. 9 is a simplified flowchart that illustrates how processor 123 can cause DEMOD WCSMSC 141 to demodulate data in accordance with a demodulation mask bitmap 156. In a first step (step 260), processor 123 prepares a task list for DEMOD WCSMSC 141 in memory 125 that includes a demodulation mask bitmap that instructs DEMOD WCSMSC 141 to perform the demodulation task. Processor 123 may, for example, write the task instruction onto the end of the task list for DEMOD WCSMSC 141 in memory 125 via high-speed first bus 124. In a second step (step 261), processor 123 updates the value of WR_PTR in the task manager of DEMOD WCSMSC 141 across slower bus 127 so that the task manager's WR_PTR points to a task list location after the ending location of the newly added task instruction. Only one write across the slow bus 127 is required to initiate execution of task instructions in the task list.

Figure 10:
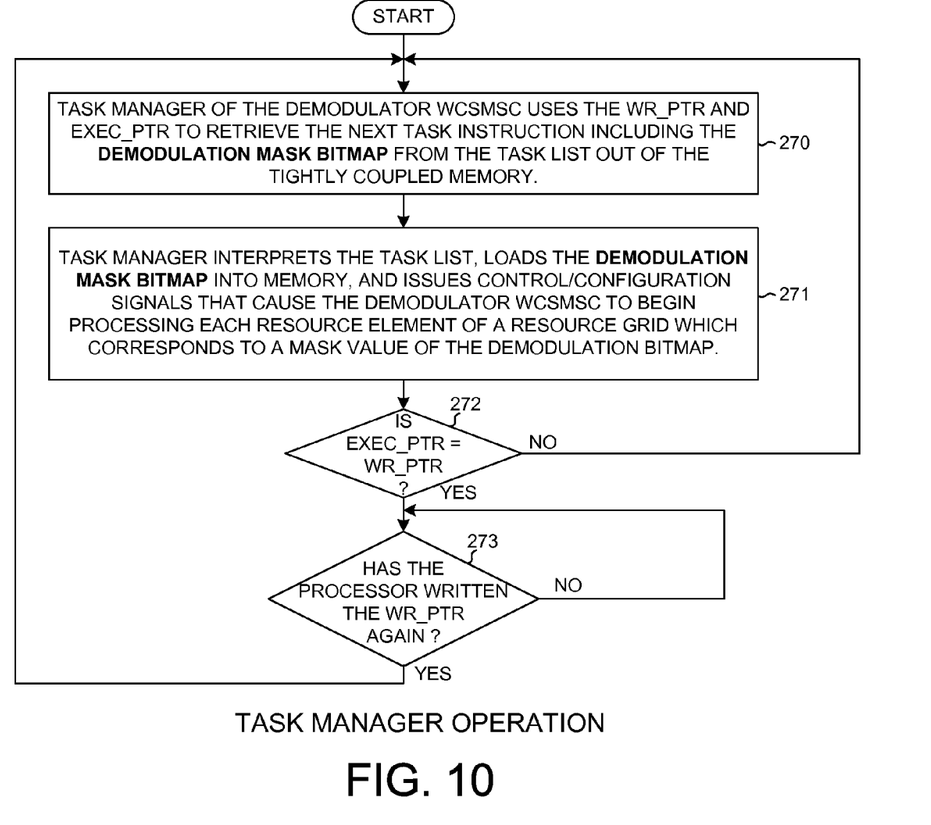
FIG. 10 is a simplified flowchart illustrating steps taken by a task manager to read a task instruction including the demodulator mask bitmap, and to initiate execution of the demodulator in accordance with the task instruction.

FIG. 10 is a simplified flowchart that illustrates how the task manager of the target WCSMSC responds to the processor operation of FIG. 9. In a first step (step 270), the task manager recognizes that its WR_PTR has been updated and in response reads the next task instruction out of its task list in memory 125; including the demodulation mask bitmap. The task manager performs this read across second bus 127. The task manager then interprets (step 271) the task instruction and generates control and/or configuration signals (for example, via conductors 311 in FIG. 7) that are supplied to the hardware block portion of the DEMOD WCSMSC 141. The control and/or configuration signals cause the hardware block portion to perform an operation specified by the task instruction. This includes causing the DEMOD WCSMSC 141 to begin zeroing each resource element of a resource grid corresponding to a digital one mask value of the demodulation bitmap. Performing this operation is referred to here as "executing" the task or executing the task instruction. Next, if the EXEC_PRT is not equal to the WR_PTR (step 272), then there are more task instructions on the task list to be read and executed. Processing returns to step 270. If, however, the EXEC_PTR equals the WR_PTR (step 272), then there are no more task instructions on the task list to be performed. Only if the processor 123 writes the WR_PTR again indicating that there are more task instructions to be executed (step 273), does the task manager return to step 270 to read a task instruction from memory 125. The task manager treats the locations between START_PTR and END_PTR in memory 125 as a circular buffer. Accordingly, if the last executed task instruction is at the end of the circular buffer then the task manager looks for a newly added task instruction at the start of the circular buffer. Buffer overflow and underflow error checks can be incorporated.

Figure 11:
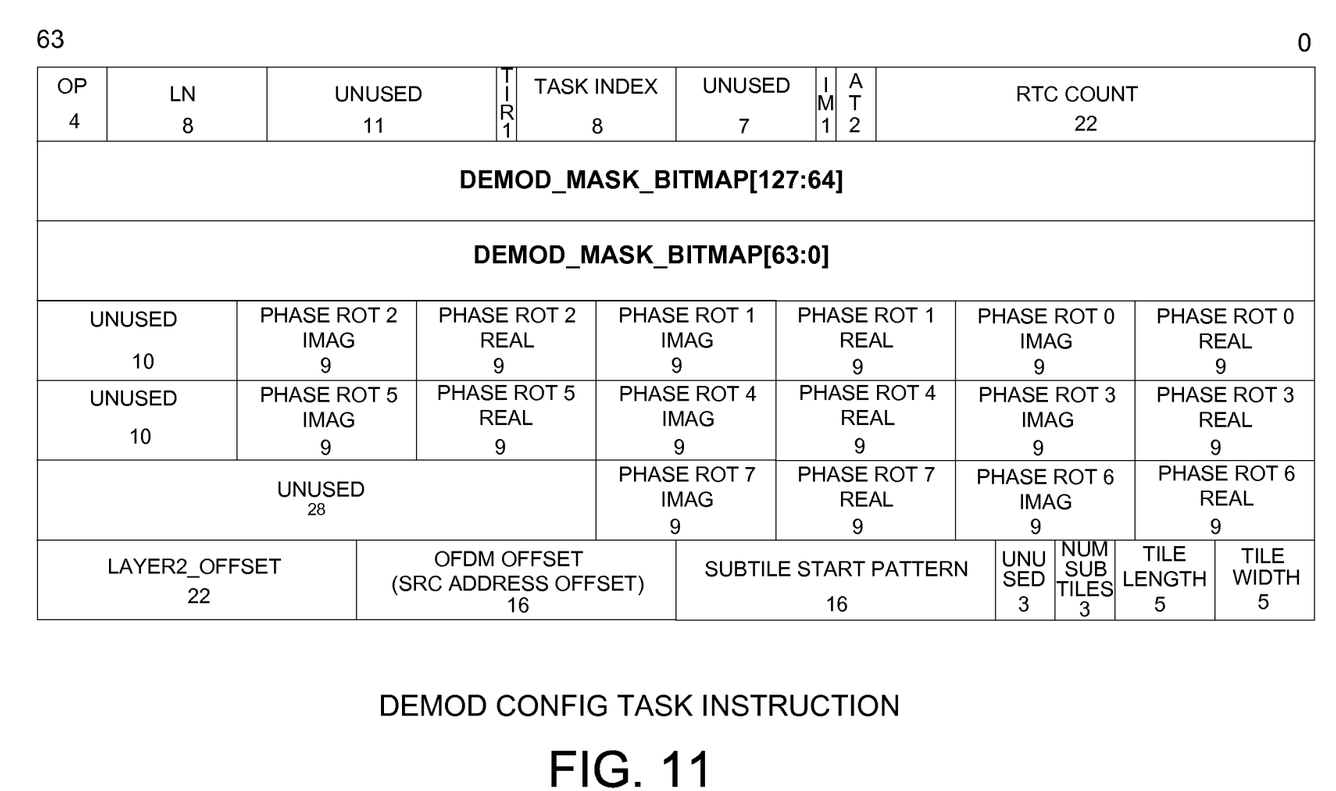
FIG. 11 is a diagram of a Demod Config task instruction that is usable to communicate a demodulation mask bitmap of mask values.

FIG. 11 is a diagram of a task instruction called "Demod Config Task". The Demod Config Task contains configuration parameters for DEMOD WCSMSC 141 including the demodulation mask bitmap 156. The first four bits "OP" are an opcode. The generic task manager portion of the task manager decodes this opcode to determine the type of task instruction and how to handle the various fields of the task instruction. The next eight "LN" bits are a length field that holds a number. This number indicates the number of words in the task instruction. The generic task manager portion of the task manager uses this length field to determine how many words to read from memory 125. The "RTC COUNT" field is a timestamp used in certain modes to determine when the task instruction can be made to be executed. The timestamp is as output by the wall clock timer 129

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. The demodulation mask bitmap is not limited to use in realizing modems that communicate in accordance with any particular air interface standard such as LTE, UMB, or WiMAX, but rather the demodulation mask bitmap has general applicability to other air interface standards and more broadly to demodulation tasks involving data sets with known corrupted elements or elements that are not relevant to the signal being communicated. Although an example is described above in which a demodulator outputs a zero-valued resource element in response to an input resource element that is not demodulated, in other examples, an arbitrary, predefined value may be used. Although an example is described above in which a digital zero mask value triggers the demodulation of an input resource element, in other examples a digital one mask value may trigger the demodulation of an input resource element. Although an example is described above in which a demodulation mask bitmap is used to control a demodulator to selectively output zero values, in other examples another circuit could be employed to zero elements of resource grids of data before decoding. Although an example is described above in which each mask value of a demodulation mask bitmap is a single-bit binary value, in other examples each mask value is a multi-bit value. Although an example is described above in which a processor writes task instructions into a tightly-coupled memory via a first bus, and task managers read task instructions out of the tightly-coupled memory via a second bus, this is but one example. In other examples, the processor and task managers access the memory that stores the task instructions via the same bus. Accordingly, various modifications, adaptations, and combinations of the various features of the described specific embodiments can be practiced without departing from the scope of the claims that are set forth below.

What is claimed is:

1. A method comprising:
    (a) receiving a demodulation mask bitmap of mask values;
    (b) receiving a resource element; and
    (c) selectivey demodulating the resource element and outputting a demodulated resource element,
    wherein the resource element is demodulated and output as a demodulated resource element if a mask value in the demodulation mask bitmap corresponding to the resource element having a first state, and
    wherein the resource element is not demodulated, and not clocked, and is output from a demodulator as a predetermined value if the mask value corresponding to the resource element comprises a second state, wherein if the resource element is a pilot resource element, a mask value of the demodulation mask bitmap comprises the second state.

2. The method of claim 1, wherein a demodulator performs the demodulating of (c), and wherein the demodulator is not clocked if the mask value corresponding to the resource element is the second state.

3. The method of claim 1, wherein the resource element is one of a plurality of resource elements, and wherein the plurality of resource elements forms a two-dimensional frequency-time matrix.

4. The method of claim 1, wherein the resource element includes a real coefficient and an imaginary coefficient of a complex number.

5. The method of claim 1, further comprising:
    (d) generating the demodulation mask bitmap of mask values, wherein if the resource element is a corrupted resource element, a mask value of the demodulation mask bitmap corresponding to the corrupted resource element has the second state.

6. The method of claim 1, wherein the receiving of (a) further involves reading a task instruction across a bus, and wherein the task instruction includes the demodulation mask bitmap.

7. The method of claim 5, wherein a Tightly Coupled Memory (TCM) system performs the generating of (d).

8. The method of claim 1, wherein the predetermined value is a zero-valued triplet.

9. A demodulator comprising:
    a plurality of sequential storage elements storing a demodulation mask bitmap of mask values; and
    a demodulation engine that selectively demodulates a resource element and outputs a demodulate resource element,
    wherein the demodulation engine demodulates the resource element and outputs the demodulated resource element if a mask value corresponding to the resource element is a first state, and
    wherein the demodulation engine does not demodulate the resource element and does not clock and outputs the resource element as a predetermined value if the mask value corresponding to the resource element is a second state and wherein if the resource element is a pilot resource element, a mask value of the demodulation mask bitmap comprises the second state.

10. The demodulator of claim 9, further comprising:
    a task manager, wherein the task manager reads a task instruction over a bus and stores the demodulation mask bitmap into the plurality of sequential storage elements; and
    an IQ fetcher that reads the resource element from a buffer.

11. The demodulator of claim 10, wherein the demodulation engine is not clocked if the mask value corresponding to the resource element is the second state.

12. An apparatus, comprising: a plurality of sequential storage elements that store a demodulation mask bitmap of mask values; and
    means for selectively demodulating a resource element and outputting a demodulated resource element wherein the resource element is demodulated and
    output as the demodulated resource element if a mask value in the demodulation mask bitmap corresponding to the resource element is a first state, and
    wherein the resource element is not demodulated and not clocked, and is output as a predetermined value if the mask value corresponding to the resource element is a second state and wherein if the resource element is a pilot resource element, a mask value of the demodulation mask bitmap comprises the second state.

13. The apparatus of claim 12, further comprising:
    means for generating a Log-Likelihood Ratio (LLR) if the mask value corresponding to the resource element is the first state, whereas if the mask value corresponding to the resource element is the second state then generating a zero-valued LLR.

14. The apparatus of claim 12, wherein the means for selectively demodulating and the plurality of sequential storage elements are parts of a radio receiver.

15. A non-transitory computer program product, comprising: a non-transitory computer-readable storage medium comprising:
    code for causing a computer to selectively demodulate a resource element and output a demodulated resource element, wherein the resource element is demodulated and output as a demodulated resource element if a mask value in a demodulation mask bitmap corresponding to the resource element has a first state, and wherein the resource element is not demodulated and not clocked and is output from a demodulator as a predetermined value if the mask value corresponding to the resource element is a second state and wherein if the resource element is a pilot resource element, a mask value of the demodulation mask bitmap comprises the second state.

16. The computer program product of claim 15, wherein the computer includes a processor, a memory, and a demodulator operatively coupled to the processor, and wherein the memory is the computer-readable storage medium and stores the code.

17. The computer program product of claim 15, wherein the computer-readable storage medium further comprises:
    code for causing the computer to output the predetermined value when the resource element is a corrupted resource element, wherein the corrupted resource element is a resource element containing corrupted data.

18. The computer program product of claim 16, wherein the mask value is one mask value in the demodulation mask bitmap, wherein the demodulation mask bitmap is a two-dimensional array of mask values.

19. The computer program product of claim 15, wherein the computer-readable medium further comprises:
    storage code for causing the computer to update the demodulation mask bitmap of mask values.

20. A method comprising:
    (a) receiving a demodulation mask of mask values;
    (b) receiving a resource element; and
    (c) controlling a demodulation engine to selectively demodulate and output the resource element depending on a multi-bit mask value of the demodulation mask corresponding to the resource element and wherein the resource element is demodulated and output as a demodulated resource element if a mask value in the demodulation mask bitmap corresponding to the resource element having a first state, and wherein the resource element is not demodulated, and not clocked, and is output from a demodulator as a predetermined value if the mask value corresponding to the resource element comprises a second state, wherein if the resource element is a pilot resource element, a mask value of the demodulation mask bitmap comprises the second state.

21. The method of claim 20, wherein the demodulation engine comprises a first demodulator and a second demodulator, wherein the first demodulator performs the demodulating of (c), and wherein the first demodulator is not clocked if the multi-bit mask value has a predetermined value.

22. The method of claim 20, wherein the resource element is one of a plurality of resource elements in a resource grid, and wherein the resource grid is a three-dimensional time-frequency-space grid.

23. The method of claim 20, wherein the demodulation mask of mask values is a three-dimensional grid of multi-bit mask values.

24. The method of claim 1, wherein the mask values of the demodulation mask bitmap comprise binary values.

25. The method of claim 1, further comprising:
receiving a signal;
generating the resource grid based on the signal; and
generating the demodulation mask bitmap of mask values based on the signal.

26. The method of claim 1, wherein the demodulation mask bitmap forms a two-dimensional array, and wherein each mask value of the demodulation mask bitmap corresponds to a respective resource element of in a resource grid.

* * * * *